(12) United States Patent
Staniforth

(10) Patent No.: US 6,834,993 B1
(45) Date of Patent: Dec. 28, 2004

(54) STRAP-ON PIPE PROBE

(75) Inventor: Peter A. Staniforth, Killingworth, CT (US)

(73) Assignee: Cooper Instrument Corporation, Middlefield, CT (US)

( * ) Notice: Subject to any disclaimer, the term of this patent is extended or adjusted under 35 U.S.C. 154(b) by 0 days.

(21) Appl. No.: 10/643,410

(22) Filed: Aug. 19, 2003

(51) Int. Cl.[7] .............................. G01K 1/14; G01K 1/08
(52) U.S. Cl. ....................... 374/147; 374/208; 374/179; 374/183; 136/221; 136/230
(58) Field of Search .................. 374/147, 208, 374/179, 183; 136/221, 230; 248/74.3, 69; 24/16 R, 17 B, 17 AP, 300

(56) References Cited

U.S. PATENT DOCUMENTS

| | | | |
|---|---|---|---|
| 343,814 A | 6/1886 | Hedden | 24/134 P |
| 1,265,141 A | 5/1918 | Trippe | 294/86.29 |
| 2,640,239 A | 6/1953 | Schneider | 24/116 |
| 2,737,050 A | * 3/1956 | Moninger | 374/147 |
| 3,087,700 A | * 4/1963 | Carpenter et al. | 248/74.3 |
| 3,444,740 A | * 5/1969 | Davis | 374/147 |
| 3,712,655 A | 1/1973 | Fuehrer | 292/321 |
| 4,150,592 A | 4/1979 | Mott | 81/64 |
| 4,214,349 A | 7/1980 | Munch | 24/16 PB |
| 4,746,223 A | * 5/1988 | Miyata et al. | 374/147 |
| 4,790,049 A | 12/1988 | Grosh | 24/132 WL |
| 4,843,687 A | 7/1989 | Kroepelin, Jr. | 24/134 P |
| 5,115,700 A | 5/1992 | Kaler, 2nd | 81/64 |
| 5,527,111 A | * 6/1996 | Lysen et al. | 374/208 |
| 5,774,945 A | 7/1998 | Ginocchio | 24/16 R |
| 6,332,248 B1 | 12/2001 | Daniggelis et al. | 24/16 PB |
| 6,334,707 B1 | * 1/2002 | Ku | 374/147 |
| 6,367,355 B1 | 4/2002 | Tanne | 81/64 |
| 6,427,561 B1 | 8/2002 | Huang | 81/64 |
| 6,471,234 B2 | 10/2002 | Ayliffe | 280/604 |
| 6,513,210 B1 | * 2/2003 | Gonzalez | 24/300 |
| 6,543,094 B2 | 4/2003 | D'Addario | 24/16 PB |
| 6,550,962 B1 | * 4/2003 | Yang et al. | 374/147 |
| 2004/0151230 A1 | * 8/2004 | Das et al. | 374/208 |

* cited by examiner

Primary Examiner—Christopher W. Fulton
Assistant Examiner—Stanley J. Pruchnic, Jr.
(74) Attorney, Agent, or Firm—Alix, Yale & Ristas, LLP

(57) ABSTRACT

A probe for measuring the surface temperature of a pipe includes a detector assembly and a rectangular strap. The detector assembly includes a rigid, unitary clamp member having a bottom, pipe engagement surface, an oppositely disposed upper surface, and first and second locking dogs extending upwardly from the upper surface. The locking dogs define a gap having a width $W_G$. A temperature sensor assembly is carried on the pipe engagement surface. The proximal end portion of the strap is mounted to the clamp member. The strap is flexible, longitudinally resilient and has a thickness $T_U$ in an unstretched condition and a thickness $T_S$ in a stretched condition, where $T_U > T_S$, $T_U > W_G$, and $W_G > T_S$. The probe is mounted to the pipe by positioning the pipe engagement surface of the clamp member against the pipe, wrapping the strap around the pipe, and applying a tensile force to the distal end portion of the strap such that the thickness of the strap decreases from $T_U$ to $T_S$. The strap is then positioned in the gap between the first and second locking dogs and the tensile force is removed. The strap expands to clamp the strap between the first and second locking dogs.

21 Claims, 4 Drawing Sheets

STRAP-ON PIPE PROBE

BACKGROUND OF THE INVENTION

This invention relates generally to surface temperature measuring devices. More particularly, the present invention relates to surface temperature measuring devices that are placed in contact with the surface whose temperature is to be measured.

Conventional surface temperature measuring devices have often included a contact plate which is placed in contact with the object surface. The size of such contact plates was determined by a number of factors. On the one hand, the contact plate must not be so small that small, localized deposits on the object surface or the contact plate disproportionately affect the heat flow to the contact surface. Small contact plates are mechanically less robust and easily bend when the temperature measuring device is subjected to a relatively high bearing pressure. On the other hand, if the contact plate is formed to be relatively large, the measurements require more time, as a result of the greater thermal capacity of the plate. It is also a disadvantage of large contact plates that sufficiently large plane areas on the object are often not available. For measuring the surface temperature of cylindrical objects, such as pipes, a separate contact plate or measuring device is required for each diameter of pipe.

Hand-held devices having contact plates are especially unreliable and inaccurate, in part because the contact plate is not placed sufficiently flush on the object surface. Over the time period typically required to measure the temperature, the operator's hand typically cannot be held still or begins to tremble, as a result of continual body movements. This causes the contact plate to tilt relative to the object surface. Pressing the contact plate more firmly against the surface in an effort to provide better contact generally only serves to increase trembling of the operator's hand. The trembling movements of the hand are of many different kinds and of large dynamic range, such that they cannot be automatically countered in the signal processing portion of the device.

SUMMARY OF THE INVENTION

Briefly stated, the invention in a preferred form is a probe for measuring the surface temperature of a pipe which comprises a detector assembly and a rectangular strap. The detector assembly includes a rigid, unitary clamp member having a bottom, pipe engagement surface, an oppositely disposed upper surface, and first and second locking dogs extending upwardly from the upper surface. The locking dogs define a gap having a width $W_G$. A temperature sensor assembly is carried on the pipe engagement surface. The proximal end portion of the strap is mounted to the clamp member. The strap is flexible, longitudinally resilient and has a thickness $T_U$ in an unstretched condition and a thickness $T_S$ in a stretched condition, where $T_U > T_S$, $T_U > W_G$, and $W_G > T_S$. The probe is mounted to the pipe for measuring the temperature of the pipe by positioning the pipe engagement surface of the clamp member against the pipe, wrapping the strap around the pipe, and applying a tensile force to the distal end portion of the strap such that the thickness of the strap decreases from $T_U$ to $T_S$. The strap is then positioned in the gap between the first and second locking dogs and the tensile force is removed, whereby a segment of the strap disposed between the first and second locking dogs expands to a thickness substantially equal to $W_G$ to clamp the strap between the first and second locking dogs.

The clamp member also has oppositely disposed first and second sides and the pipe engagement surface of the clamp member has an arcuate shape, defining a groove extending laterally from the first side of the clamp member to the second side of the clamp member. The temperature sensor assembly includes a resilient member mounted to the clamp member within a recess in the pipe engagement surface. A sensor subassembly mounted to the resilient member extends from the recess and a signal carrying conductor extends from the sensor subassembly and through a port in a one of the sides of the clamp member. A sleeve may be disposed around a portion of the signal carrying conductor proximate to the side of the clamp member, an end portion of the sleeve being mounted to or engaged by the clamp member.

A strap mount extends laterally from the rear surface of the clamp member. The strap mount includes a substantially planar member having first and second identical, longitudinally extending slots forming a bar therebetween. The strap extends from the distal end portion upwardly through the first slot, wraps around the bar and extends downwardly through the second slot to the proximal end portion. The first and second slots each has a width $W_{SL}$, where $W_{SL} > T_U$ and $W_{SL} < 2T_U$, and the proximal end portion of the strap is formed in a loop. The strap is removable from the strap mount by applying a tensile force to the proximal end portion and the looped proximal end portion prevents the strap from being drawn though the strap mount when a tensile force is applied to the distal end portion.

Each of the locking dogs has a triangular-shape and an inner wall, the inner walls defining a V-shaped strap-receiving channel. When the strap is positioned in the gap between the locking dogs, the inner walls of the locking dogs engaging the strap and the V-shape of the strap-receiving channel longitudinally folds the segment of the strap in the strap-receiving channel. Vertically-extending inner corners of the locking dogs form the gap, where $2T_U > W_G > 2T_S$.

It is an object of the invention to provide a new a nd improved probe for measuring the surface temperature of a pipe.

It is also an object of the invention to provide a probe which is temporarily installed by hand to measure the surface temperature of a pipe, but which holds itself in place on the pipe surface.

Other objects and advantages of the invention will become apparent from the drawings and sp specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
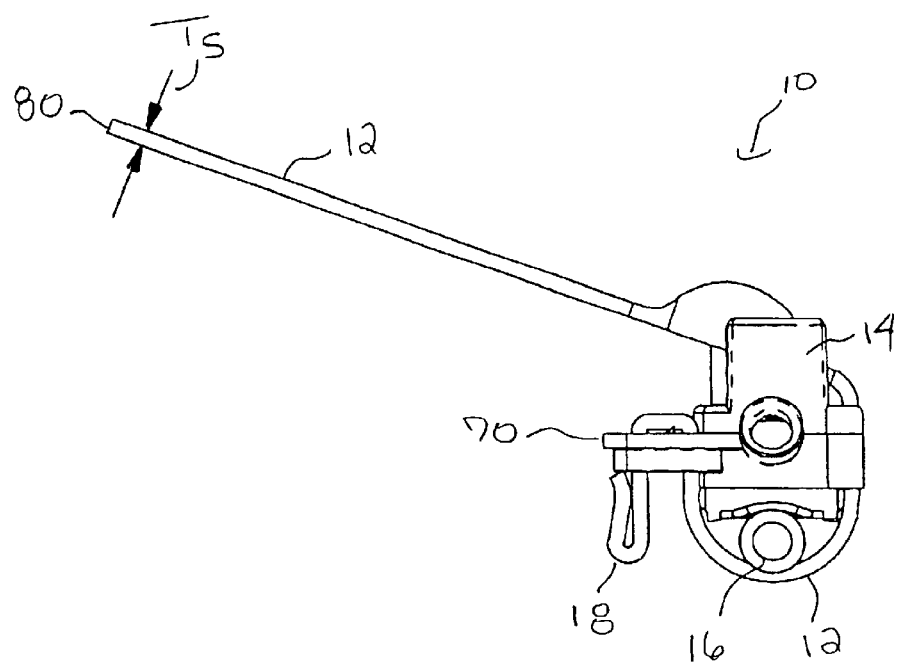
FIG. 1 is a left-side view of a pipe probe in accordance with the invention showing the pipe probe being installed on a pipe.
Figure 2:
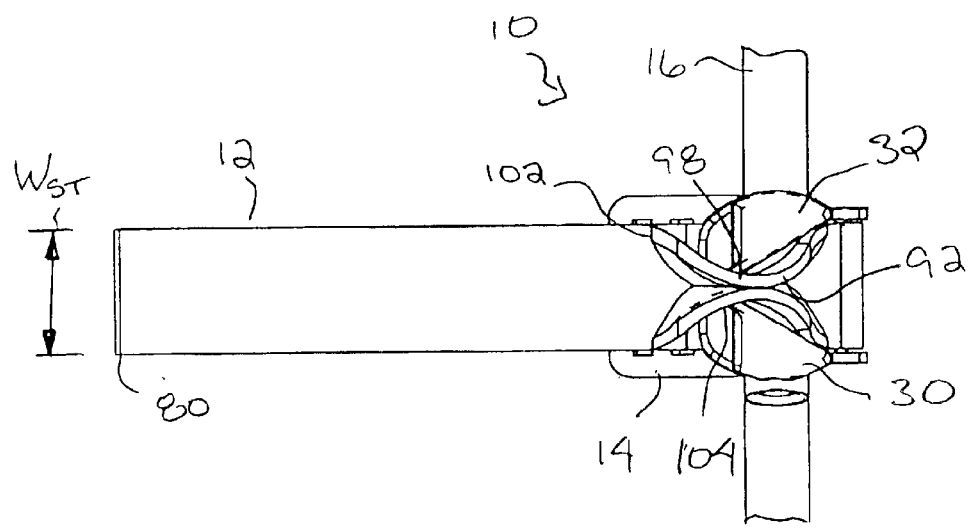
FIG. 2 is a top view of the pipe probe of FIG. 1, showing the pipe probe strapped to a pipe.
Figure 3:
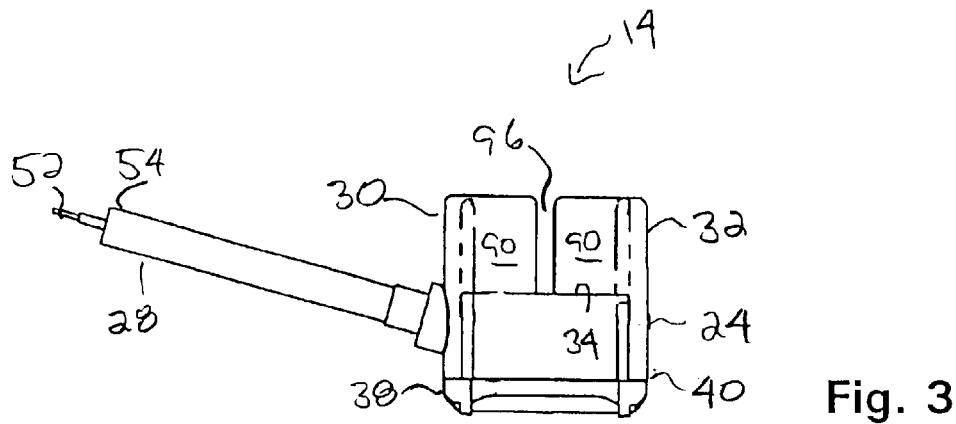
FIG. 3 is a front view of the detector assembly of FIG. 1.
Figure 4:
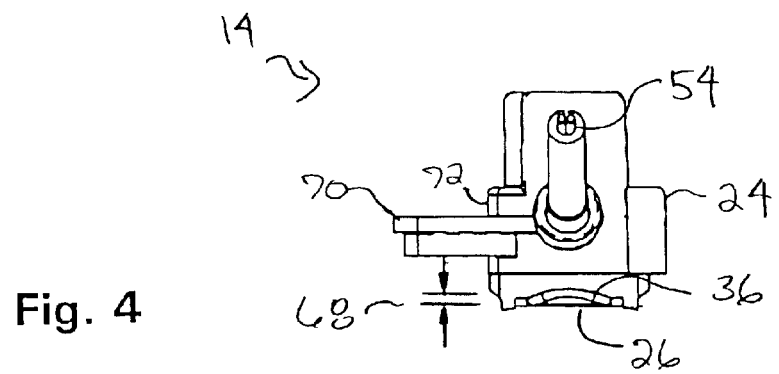
FIG. 4 is a left-side view of the detector assembly of FIG. 1.
Figure 5:
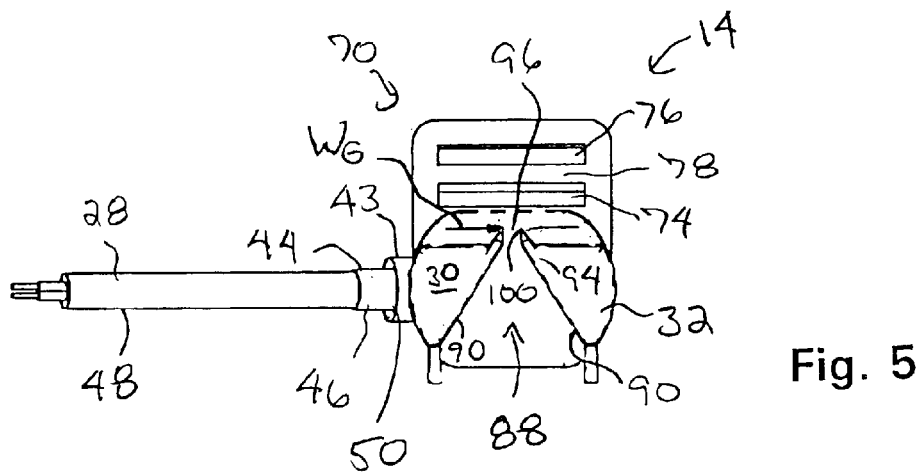
FIG. 5 is a top view of the detector assembly of FIG. 1.
Figure 6:
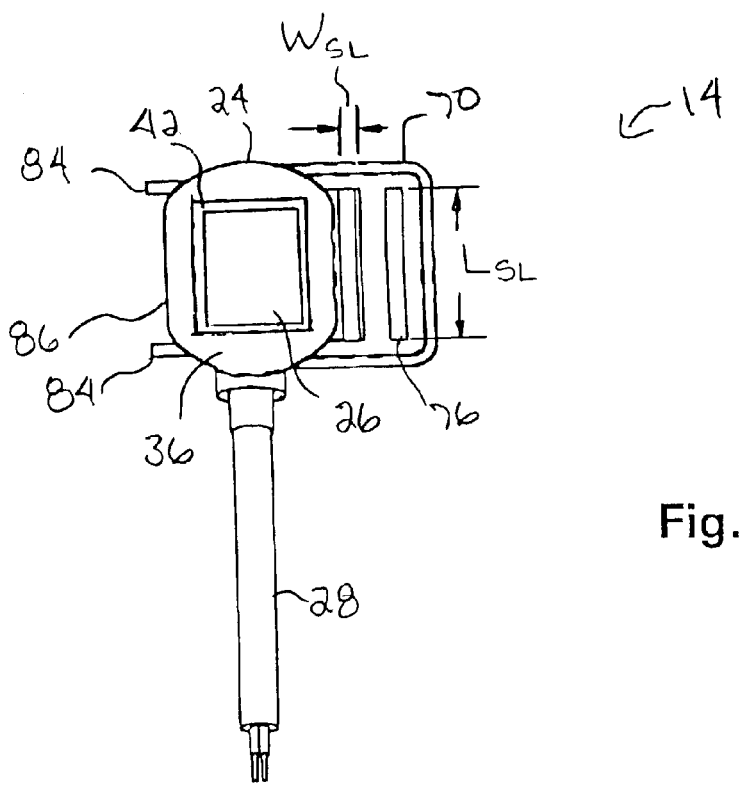
FIG. 6 is a bottom view of the detector assembly of FIG. 1.

With reference to the drawings wherein like numerals represent like parts throughout the several figures, a pipe probe in accordance with the present invention is generally designated by the numeral 10. The pipe probe 10 includes a strap 12 which temporarily mounts a detector assembly 14 to a pipe 16 for sensing the temperature of the pipe 16 (FIGS. 1 and 2). To facilitate description, the pipe probe 10 will be referred to as having a vertical orientation as viewed in FIG. 1. It should be appreciated that the pipe probe 10 may be used in any orientation and with pipes extending in any direction.

Figure 7:
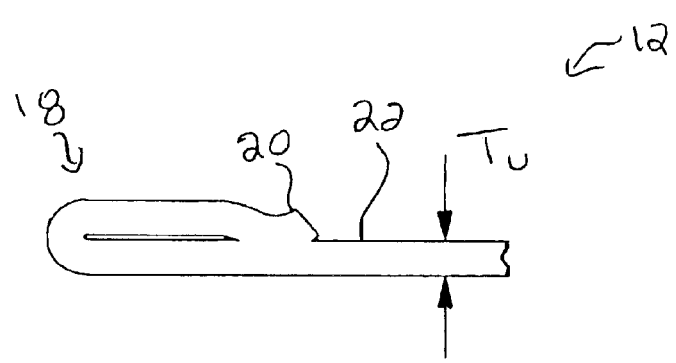
FIG. 7 is a side view of the strap of FIG. 1.

With reference to FIG. 7, the strap 12 has a longitudinally extending rectangular shape and is composed of an elastically deformable material, which is flexible and longitudinally resilient. The rectangular cross-sectional shape resists skewing of the detector assembly 14 on the pipe 16 and also resists longitudinal movement of the pipe probe 10 along the pipe 16. In a preferred embodiment, strap 12 is a woven polyester elastic strap. However, strap 12 may be Lycra™ or a woven, knitted or braided elastic. Similarly, strap 12 may include any elastomer, for example natural or butyl rubber, or urethane, or an elastomer covered with a polymer. When a tensile force is applied to the strap 12, it stretches longitudinally and the thickness decreases. That is, strap 12 has a thickness $T_U$ (FIG. 7) in an unstretched condition and a thickness $T_S$ (FIG. 1) in a stretched condition, where $T_U > T_S$. The proximal end portion 18 of strap 12 is formed in a loop, with the proximal end 20 being mounted to one of the sides 22 of the strap 12. Proximal end 20 may be mounted to side 22 by stitching, sonic-weld, or any conventional means.

With reference to FIGS. 3–6, the detector assembly 14 includes a clamp member 24, a temperature sensor assembly 26, and a signal-carrying conductor 28. The clamp member 24 is a rigid, unitary structure, preferably composed of a polymeric material which may be easily molded. Clamp member 24 includes triangular-shaped first and second locking dogs 30, 32 which extend upwardly from a top surface 34 of the clamp member 24. A bottom, pipe engagement surface 36 of the clamp member 24 preferably has an arcuate shape, forming a groove extending laterally from the left side 38 of the clamp member 24 to the right side 40 of the clamp member 24 for receiving a portion of the pipe 16.

As explained in greater detail below, the temperature sensor assembly 26 is mounted in a recess 42 in the pipe engagement surface 36. The signal-carrying conductor 28 extends from the temperature sensor assembly 26 to a conventional connector (not shown) through a port 43 in one of the sides 38, 40 of the clamp member 24. Preferably, the portion 44 of the signal-carrying conductor 28 immediately adjacent to the side 38, 40 of clamp member 24 extends through a sleeve 46 which closely conforms to the outer surface 48 of the signal-carrying conductor 28. The sleeve 46 is composed of a material which is flexible, but no more flexible than the signal-carrying conductor 28, and has a proximal end portion 50 mounted to or engaged by the clamp member 24. Sleeve 46 limits flexure of the signal-carrying conductor 28 where it exits the clamp member 24, preventing stress related failure of the signal carrying elements 52 and/or protective/insulating jacket 54 of the signal-carrying conductor 28.

Figure 8:
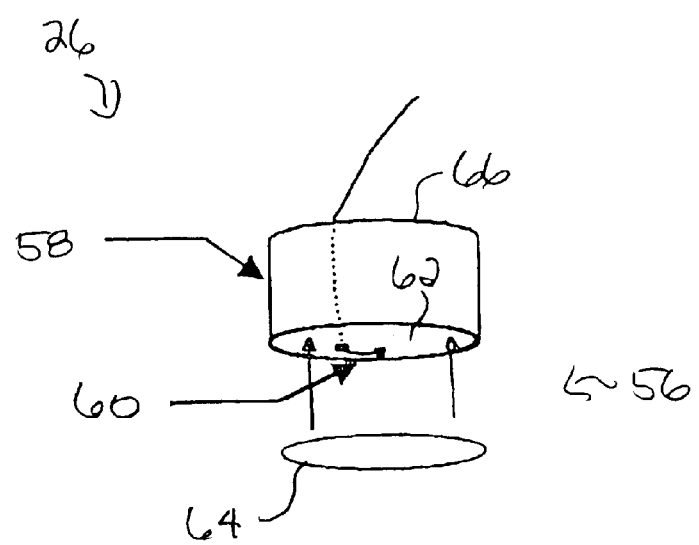
FIG. 8 is an enlarged schematic view of the temperature sensor assembly of FIG. 1.

With reference to FIG. 8, the temperature sensor assembly 26 preferably includes a sensor subassembly 56 which is mounted to a resilient underlayment 58. The sensor subassembly 56 comprises a thermistor 60 mounted between inner and outer heat transfer elements 62, 64. Preferably, the outer heat transfer element 64 is a thin, copper foil disk, plate or channel and the inner heat transfer element 62 is a thin, aluminum foil disk. The construction of the sensor subassembly 56 protects the thermistor sensor 60 from exposure to humidity, moisture and outside contaminants while providing for rapid response to changes in the sensed heat. Preferably, the resilient underlayment 58 is a pad of foam material.

Alternatively, the temperature sensor assembly 26 may comprise a thermocouple. Such a thermocouple may be mounted to a resilient underlayment (similar to the thermistor described above) or mounted to a flexible channel. The thermocouple could also be perforated, to limit the rate of heat dissipation and mounted directly to the clamp member.

The temperature sensor assembly 26 is positioned in the recess 42 in the pipe engagement surface 36 of the clamp member 24, with the signal-carrying conductor 28 extending through an opening in pipe engagement surface 36. The top surface 66 of the resilient underlayment 58 is mounted to the surface of the recess 42, with the sensor subassembly 56 positioned at a distance 68 below the pipe engagement surface 36. The resilient nature of the underlayment 58 allows relative movement between the sensor subassembly 56 and the clamp member 24. Accordingly, the outer surface of the pipe 16 is contacted by the outer heat transfer element 64 before the pipe engagement surface 36 and the resilient underlayment 58 is compressed as the pipe engagement surface 36 moves into contact with the surface of the pipe 16. This action ensures that there is sufficient contact between the outer heat transfer element 64 and the pipe 16 to provide for fast and accurate sensing of the pipe temperature. It should be appreciated that this action allows the sensor subassembly 56 to be cocked relative to the pipe engagement surface 36 when the outer surface of the pipe 16 has an uneven configuration.

With additional reference to FIGS. 3–6, a strap mount 70 extending laterally from the rear surface 72 of the clamp member 24 includes a pair of substantially identical, longitudinally extending slots 74, 76 forming a bar 78 therebetween. As shown in FIG. 1, strap 12 extends from the distal end 80, upward through slot 74, wraps around bar 78, and extends downward through slot 76 to the proximal end portion 18. The length $L_{SL}$ of each slot 74, 76 is slightly greater than the width $W_{ST}$ of the strap (FIG. 2). The width $W_{SL}$ of each slot 74, 76 is greater than the thickness of the strap 12 in an unstretched condition ($W_{SL} > T_U$), less than twice the thickness of the strap 12 in an unstretched condition ($W_{SL} < 2T_U$), and preferably is less than twice the thickness of the strap 12 in a stretched condition ($W_{SL} < 2T_S$). Accordingly, the loop in the proximal end portion 18 prevents the strap 12 from slipping out of the strap mount 70 during installation, use and removal of the pipe probe 10. It should be appreciated that since the strap 12 is not permanently mounted to the clamp member 24, the strap 12 may be easily replaced when it becomes worn or losses its elasticity.

To sense the temperature of a pipe 16, the pipe probe 10 is temporarily mounted to the pipe 16 by positioning the pipe engagement surface 36 of the clamp member 24 against the surface of the pipe 16 such that the pipe 16 extends longitudinally in the groove formed by the engagement surface 36. The strap 12 is wrapped around the pipe 16 and is aligned with the strap receiving channel 88 by positioning the strap 12 between a pair of indexing tabs 84 that extend laterally from the front surface 86 of the clamp member 24, proximate to each side 38, 40 of the clamp member 24. Grasping the distal end portion of the strap 12, the operator applies a tensile force by pulling the strap 12. Initially, the tensile force draws the pipe engagement surface 36 and the strap 12 into firm engagement with the surface of the pipe 16. Continued application of the tensile force causes the strap 12 to transition from the unstretched condition to the stretched condition, causing the thickness of the strap 12 to decrease sufficiently to allow the operator to position the strap 12 between the locking dogs 30, 32. The operator then stops pulling on the strap 12, removing the tensile force, causing the strap 12 to transition from the stretched condition to the unstretched condition and further causing the strap 12 to be clamped between the locking dogs 30, 32. After the temperature has been sensed, the operator may remove the pipe probe 10 by grasping the distal end portion of the strap 12 and applying a tensile force by pulling on the strap 12. When the thickness of the strap 12 has decreased sufficiently, the strap 12 may be removed from between the locking dogs 30, 32 and unwrapped from around the pipe 16.

The locking dogs 30, 32 form a strap-receiving channel 88 defined by the two inner walls 90 of the locking dogs 30, 32. As explained above, strap 12 is composed of an elastically deformable material and has a thickness $T_U$ in an unstretched condition and a thickness $T_S$ in a stretched condition, where $T_U > T_S$. As described above, the strap 12 in the stretched condition is positioned between the locking dogs 30, 32 to mount the pipe probe 10 to the pipe 16. As the operator draws the strap 12 down into the strap-receiving channel 88, the strap 12 is drawn down the inner faces 90 of the locking dogs 30, 32, the v-shape of the strap-receiving channel 88 causing a portion 92 of the strap 12 to fold longitudinally (FIG. 2). The vertically-extending, inner corners 94 of the locking dogs 30, 32 define a gap 96 having a width $W_G$, where $2T_U > W_G > 2T_S$. Accordingly, strap 12 may be positioned within gap 96 or removed from gap 96 when the strap 12 is in the stretched condition. Further, the segment 98 of the strap 12 located in gap 96 will be clamped between the inner corners 94 of the locking dogs 30, 32 as the strap transitions from the stretched condition to the unstretched condition. That is, as the tensile force stretching the strap 12 is removed, the thickness of the strap 12 will increase from $T_S$ to $T_U$, with the total thickness of the strap segment 98 located in gap 96 being crimped to $W_G$. Since strap segment 98 is part of the doubled-up strap portion 92, the actual thickness of the crimped strap segment 98S $W_G/2$.

Preferably, the inner corners 94 have a narrow blade shape, extending rearwardly and laterally inward into the strap-receiving channel 88. The relatively sharp trailing edges 100 of the corners 94 create a better defined transition in the thickness of the strap 12 from the crimped strap segment 98 (having a total thickness $W_G$) to the uncrimped strap segment 102 of the doubled-up strap portion 92 (having a thickness of $2T_U$), providing a greater frictional force between the trailing edges 100 and the strap 12. Generally, the transition in thickness is sufficiently abrupt that a shoulder 104 is formed in the strap 12 at the transition of crimped strap segment 98 to uncrimped strap segment 102, with the trailing edges 98 engaging the shoulder 104 to provide a greater resistance to pull through. In addition, the folded strap portion 92 is self-biased to unfold, applying an additional sideways pressure on the trailing edges 100.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A probe for measuring the surface temperature of a pipe, the probe comprising:
    a detector assembly including
        a rigid, unitary clamp member having a bottom, pipe engagement surface, an oppositely disposed upper surface, and first and second locking dogs extending upwardly from the upper surface defining a gap having a width $W_G$ therebetween, and
        a temperature sensor assembly carried on the pipe engagement surface; and
    a strap having a rectangular shape and extending longitudinally from a proximal end portion to a distal end portion, the proximal end portion being mounted to the clamp member, the strap being flexible and longitudinally resilient and having a thickness $T_U$ in an unstretched condition and a thickness $T_S$ in a stretched condition, where $T_U > T_S$, $T_U > W_G$, and $W_G > T_S$;
    wherein the probe is mounted to the pipe for measuring the temperature of the pipe by positioning the pipe engagement surface of the clamp member against the pipe, wrapping the strap around the pipe, applying a tensile force to the distal end portion of the strap, whereby the thickness of the strap decreases from $T_U$ to $T_S$, positioning the strap in the gap between the first and second locking dogs, and removing the tensile force, whereby a segment of the strap disposed between the first and second locking dogs expands to a thickness substantially equal to $W_G$ to clamp the strap between the first and second locking dogs.

2. The probe of claim 1 wherein the strap is composed of an elastically deformable material.

3. The probe of claim 1 wherein the clamp member is composed of a polymeric material.

4. The probe of claim 1 wherein the clamp member also has oppositely disposed first and second sides and the pipe engagement surface of the clamp member has an arcuate shape, defining a groove extending laterally from the first side of the clamp member to the second side of the clamp member.

5. The probe of claim 4 wherein the pipe engagement surface has a recess, the temperature sensor assembly being mounted in the recess.

6. The probe of claim 5 wherein the temperature sensor assembly includes:
    a resilient member disposed within the recess and mounted to the pipe engagement surface;
    a sensor subassembly mounted to the resilient member and extending from the recess; and
    a signal carrying conductor extending from the sensor subassembly and through a port in a one of the sides of the clamp member.

7. The probe of claim 6 wherein the signal carrying conductor has a proximal portion extending from the side of the clamp member and the detector assembly also includes a sleeve disposed around the proximal portion of the signal carrying conductor, the sleeve having an end portion mounted to or engaged by the clamp member.

8. The probe of claim 6 wherein the sensor subassembly comprises a thermistor mounted between inner and outer heat transfer elements.

9. The probe of claim 6 wherein the sensor subassembly comprises a thermocouple.

10. The probe of claim 1 wherein the clamp member also has oppositely disposed front and rear surfaces and a strap mount extending laterally from the rear surface, the proximal end portion of the strap being mounted to the strap mount.

11. The probe of claim 10 wherein the strap mount includes a substantially planar member defining first and second substantially identical, longitudinally extending slots forming a bar therebetween, the strap extending from the distal end portion upwardly through the first slot, wrapping around the bar and extending downwardly through the second slot to the proximal end portion.

12. The probe of claim 11 wherein the first and second slots each has a width $W_{SL}$, where $W_{SL} > T_U$ and $W_{SL} < 2T_U$, and the proximal end portion of the strap is formed in a loop, whereby the strap is removable from the strap mount by applying a tensile force to the proximal end portion and the looped proximal end portion prevents the strap from being drawn though the strap mount when a tensile force is applied to the distal end portion.

13. The probe of claim 12 wherein $W_{SL} < 2T_S$.

14. The probe of claim 10 wherein the clamp member further has oppositely disposed first and second sides and a pair of indexing tabs extending laterally from the front surface proximate to each side, the indexing tabs aligning the strap with the gap between the first and second locking dogs when the probe is mounted to the pipe.

15. The probe of claim 1 wherein each of the locking dogs has a triangular-shape and an inner wall, the inner walls defining a V-shaped strap-receiving channel, the inner walls of the locking dogs engaging the strap and the V-shape of the strap-receiving channel longitudinally folding a segment of the strap as the strap is positioned in the gap between the locking dogs.

16. The probe of claim 15 wherein each of the locking dogs has a vertically-extending inner corner, the inner corners of the locking dogs defining the gap, wherein $2T_U > W_G > 2T_S$.

17. The probe of claim 16 wherein each of the inner corners of the locking dogs has a narrow blade shape, extending rearwardly and laterally inward into the strap-receiving channel.

18. A probe for measuring the surface temperature of a pipe, the probe comprising:

a detector assembly including a rigid, unitary clamp member having a bottom, pipe engagement surface, an oppositely disposed upper surface, oppositely disposed first and second sides, oppositely disposed front and rear surfaces, a strap mount extending laterally from the rear surface, and first and second locking dogs extending upwardly from the upper surface defining a gap having a width $W_G$ therebetween, and a temperature sensor assembly carried on the pipe engagement surface; and a strap having a rectangular shape and extending longitudinally from a proximal end portion to a distal end portion, the proximal end portion being mounted to the strap mount, the strap being flexible and longitudinally resilient and having a thickness $T_U$ in an unstretched condition and a thickness $T_S$ in a stretched condition, where $T_U > T_S$, $T_U > W_G$, and $W_G > T_S$;

wherein the probe is mounted to the pipe for measuring the temperature of the pipe by positioning the pipe engagement surface of the clamp member against the pipe, wrapping the strap around the pipe, applying a tensile force to the distal end portion of the strap, whereby the thickness of the strap decreases from $T_U$ to $T_S$, positioning the strap in the gap between the first and second locking dogs, and removing the tensile force, whereby a segment of the strap disposed between the first and second locking dogs expands to a thickness substantially equal to $W_G$ to clamp the strap between the first and second locking dogs.

19. The probe of claim 18 wherein the pipe engagement surface has a recess and the temperature sensor assembly includes:

a resilient member disposed within the recess and mounted to the pipe engagement surface;

a sensor subassembly mounted to the resilient member and extending from the recess; and a signal carrying conductor extending from the sensor subassembly and through a port in a one of the sides of the clamp member.

20. The probe of claim 18 wherein the proximal end portion of the strap is formed in a loop and the strap mount defines at least one longitudinally extending slot having a width $W_{SL}$, where $W_{SL} > T_U$ and $W_{SL} < 2T_U$, the strap extending from the distal end portion through the slot to the proximal end portion, whereby the strap is removable from the strap mount by applying a tensile force to the proximal end portion and the looped proximal end portion prevents the strap from being drawn though the strap mount when a tensile force is applied to the distal end portion.

21. The probe of claim 18 wherein each of the locking dogs has an inner wall extending from a vertically-extending, inner corner disposed proximate to the rear surface to a vertically-extending, outer corner disposed proximate to the front surface, the inner corners of the locking dogs defining the gap, the inner walls engaging the strap and longitudinally folding a segment of the strap as the strap is positioned in the gap between the locking dogs, wherein $2T_U > W_G > 2T_S$.

* * * * *